United States Patent
Oicherman et al.

(10) Patent No.: US 9,368,086 B2
(45) Date of Patent: Jun. 14, 2016

(54) MINIMIZING UNWANTED CHANGES OF COLOR DURING IMAGE PROCESSING

(75) Inventors: Boris Oicherman, Kiriat Tivon (IL); Pavel Kisilev, Maalot (IL); Doron Shaked, Tivon (IL)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2224 days.

(21) Appl. No.: 12/403,504

(22) Filed: Mar. 13, 2009

(65) Prior Publication Data
US 2010/0232694 A1 Sep. 16, 2010

(51) Int. Cl.
| | |
|---|---|
| G06K 9/00 | (2006.01) |
| G06K 9/36 | (2006.01) |
| G09G 5/02 | (2006.01) |
| H04N 1/60 | (2006.01) |
| H04N 9/67 | (2006.01) |
| G06T 5/00 | (2006.01) |

(52) U.S. Cl.
CPC *G09G 5/02* (2013.01); *G06T 5/007* (2013.01); *H04N 1/6027* (2013.01); *H04N 1/6058* (2013.01); *H04N 9/67* (2013.01); *G06T 2207/10024* (2013.01); *G09G 2320/066* (2013.01); *G09G 2340/06* (2013.01)

(58) Field of Classification Search
None
See application file for complete search history.

(56) References Cited

U.S. PATENT DOCUMENTS

| | | | | |
|---|---|---|---|---|
| 4,812,903 | A * | 3/1989 | Wagensonner et al. | 358/521 |
| 5,416,890 | A * | 5/1995 | Beretta | 345/590 |
| 5,426,517 | A * | 6/1995 | Schwartz | 358/520 |
| 5,450,216 | A * | 9/1995 | Kasson | 358/518 |
| 6,463,173 | B1 * | 10/2002 | Tretter | 382/168 |
| 6,775,028 | B1 * | 8/2004 | Reel | 358/1.9 |
| 6,867,883 | B1 * | 3/2005 | Cholewo et al. | 358/1.9 |
| 6,873,434 | B1 * | 3/2005 | Kohler et al. | 358/1.9 |
| 6,956,581 | B2 * | 10/2005 | Cui et al. | 345/589 |
| 7,423,696 | B2 * | 9/2008 | Samadani et al. | 348/645 |
| 2003/0117457 | A1* | 6/2003 | Qiao | 347/43 |
| 2007/0097389 | A1* | 5/2007 | Morovic | 358/1.9 |

* cited by examiner

*Primary Examiner* — Feng Niu
(74) *Attorney, Agent, or Firm* — HP Inc. Patent Department

(57) ABSTRACT

An image is processed in a device-independent color space by applying a modification function to one or more dimensions of that color space. The image is then converted into a target device-dependent color space. In order to minimize unwanted changes of color arising from the modification function taking image color values out of gamut when converted to the target device-dependent color space, the modification function is scaled to limit modified image values to within modification limits that are determined, for each image pixel or group of pixels, in dependence on the target device-dependent color space gamut boundary in the device-independent color space.

22 Claims, 2 Drawing Sheets

MINIMIZING UNWANTED CHANGES OF COLOR DURING IMAGE PROCESSING

BACKGROUND

A device-dependent color space comprises the colors that a device can produce and a color within the space is generally specified by values of a set of color components to which the device is responsive (these components depend on the particular color model being used, for example, the RGB color model is normally used for color additive devices, such as monitors, and has the color components Red, Green and Blue; for color subtractive devices such as printers, the CMYK color model is normally used and has the color components Cyan, Magenta, Yellow and Black).

A device-dependent color space itself is a more or less arbitrary color system until mapped to a reference color space with an agreed color interpretation. Mapping a device-dependent color space to a reference, device-independent, color space results in a definite "footprint" within the reference color space known as a 'gamut'. The most extreme points in the gamut are termed gamut boundaries. A color in the reference color space that lies outside the gamut boundaries is said to be out of gamut, and cannot be reproduced by the device.

Gamut boundaries are most conveniently defined in the device-independent colour spaces which are uniform. Such spaces must satisfy two main conditions: a) visual difference between two colours can be expressed as a Euclidean distance between two points representing these colours in the uniform colour space, and b) same distances signify the same perceptual colour difference independently of their location within the uniform colour space.

A number of uniform device-independent colour spaces exist. The most widely used ones are those developed and published by the International Commission on Illumination (Commission Internationale d'Eclairage, or CIE). Among the CIE colour spaces, the most common is the L*a*b* (CIELAB). The three coordinates (or dimensions/components) of CIELAB represent the lightness of the color (L*=0 yields black and L*=100 indicates white), its position between red/magenta and green (a*, negative values indicate green while positive values indicate magenta) and its position between yellow and blue (b*, negative values indicate blue and positive values indicate yellow). The L* component closely matches human perception of lightness.

Related to the CIE L*a*b* (CIELAB) color space, is the CIE L*C*h (CIELCH) color space which is a cylindrical representation of the three perceptual color correlates: lightness, chroma, and hue. The axial component of CIELCH is the same lightless attribute L* as CIE L*a*b*, the radial component is the chroma, and the angular component is hue. The transformation of (a*, b*) to (C*, h) is given by:

$$C^*_{ab} = \sqrt{a^{*2} + b^{*2}}$$
$$h_{ab} = \arctan\left(\frac{b*}{a*}\right)$$

Other color spaces published by the CIE include colour-appearance spaces CIECAM97 and CIECAM02. While different from CIELAB in properties, all these spaces define similar axes of Lightness, green-magenta and blue-yellow, and have cylindrical representation of Lightness, Chroma and Hue. Other uniform colour spaces are expected to be published in the future.

The majority of image processing algorithms for image enhancement operate on the lightness component of the image modifying this component to effect some desired enhancement, such as local and global contrast manipulations, sharpening, gamma correction etc. For example, contrast enhancement of an image encoded in a device-dependent RGB color space is often carried out as a three-stage process:

1) the image is converted from the device-dependent RGB color space to CIELAB;
2) contrast enhancement manipulations are applied to the lightness L* channel; and
3) the resulting image is converted back to the device-dependent RGB color space.

A problem that may arise, however, is that the lightness contrast enhancement causes pixel colors to drift out of the original device color gamut. In stage 3, as these colors are mapped back to the device-dependent RGB color space, their colors may shift. The direction and the magnitude of the shift depends on the gamut mapping algorithm used for stage 3, and is not controllable by the contrast enhancement algorithm. For example: in the case of standard sRGB transformation the out-of-gamut colors are clipped, resulting in a severe reduction of chroma contrast and loss of Chroma details.

BRIEF DESCRIPTION OF THE DRAWINGS

Embodiments of the invention will now be described, by way of non-limiting example, with reference to the accompanying diagrammatic drawings, in which.

DETAILED DESCRIPTION

Figure 1:
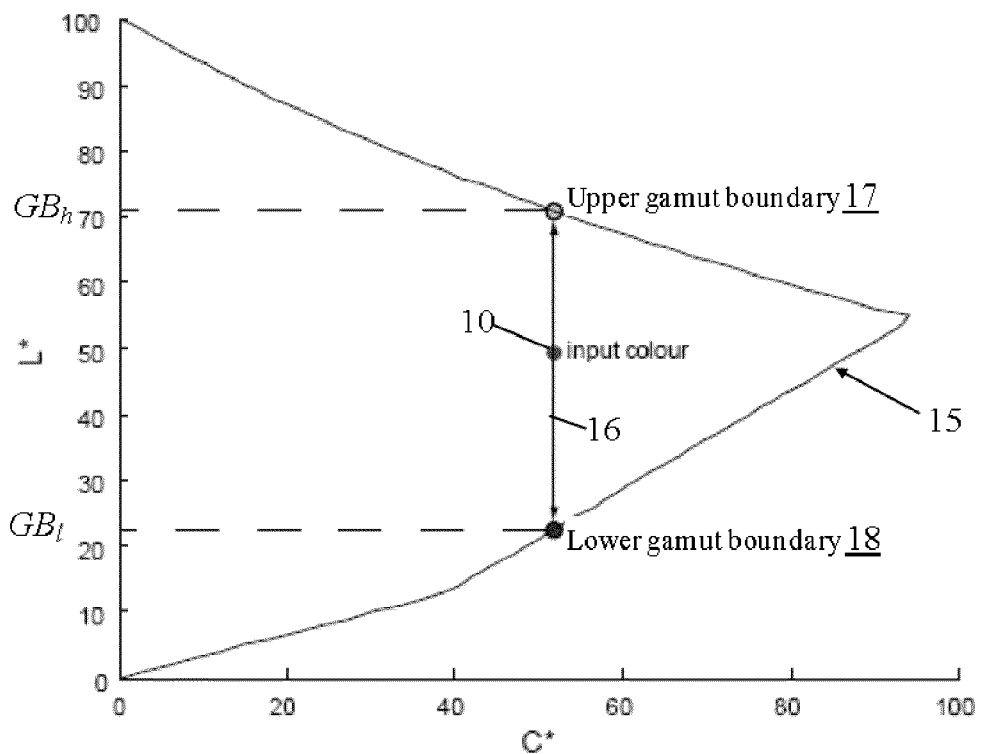
FIG. 1 is a graph depicting a device gamut boundary in the lightness and chroma dimensions of the CIELCH color space for a given hue value.

In the embodiments of the invention described below, an image is subject to contrast enhancement by the application of a modification function f(x) to a lightness component of the image color. However, as will be elucidated hereinafter, the invention is not limited to modification functions such as contrast enhancement that operate on lightness, but is more generally applicable to any image color modification function for modifying one or more components of image color. Furthermore, the use of an RGB color space as the device dependent color space in which the image starts and finishes is merely exemplary as is the use of CIELAB and CIELCH as the device independent color space in which the modification function is applied.

In general terms, in the embodiments of the invention now to be described with reference to FIGS. 1 to 3, the pixel values of the image are initially provided encoded in an RGB device dependent color space (for example, the color space of a particular computer monitor) and are converted for processing to values of a device independent color space (such as CIELCH) that has a lightness dimension L* orthogonal to the other dimensions (C*, h) of the color space. A modification function f(x) is then applied to the lightness value of each pixel but only after scaling to ensure that the resultant modified lightness value will be within gamut when the image is converted back into the device dependent color space. This scaling substantially avoids any unwanted changes in color that might arise if the modified pixel values were out of gamut.

Appropriate scaling of the modification function f(x) involves determining upper and lower limits (bounds) on the permissible range of lightness values in the device independent color space. FIG. 1 is a graph with axes corresponding to the lightness L* and chroma C* dimensions of the CIELCH color space. Reference 10 indicates a pixel of the original image as mapped to the CIELCH color space. Reference 15 indicates the gamut boundary of the image's initial RGB device dependent color space as mapped into the CIELCH color space for the specific hue value of the pixel 10. The modification function f(x) is arranged only to modify the pixel's lightness value L* leaving its chroma C* and hue h values unchanged; in other words, the modification function f(x) can only change the value of the pixel 10 along a line 16, parallel to the lightness axis, that passes through point 10. However, to keep the lightness value L* of a modified pixel within the gamut of the device dependent color space, the permissible range over which lightness can vary (for the given chroma and hue values of the pixel 10) is set by the intersection of the line 16 with the gamut boundary 15, namely an upper bound 17 of value $GB_h$ and a lower bound 18 of value $GB_l$. As will be described more fully below, these values $GB_h$ and $GB_l$ are used as parameters for scaling the modification function f(x).

It will be appreciated that the shape of the gamut boundary 15 shown in FIG. 1 is specific to the particular hue value of the pixel 10; for a pixel with a different hue value, the gamut boundary will generally differ from that shown in FIG. 1. The gamut boundary 15 is derived from the Gamut Boundary Description (GBD) which is a table that contains device Lightness boundaries for each Chroma and Hue values in the device gamut; the GBD can be extracted from the device ICC profile or derived from any other mapping between the device-dependent and device-independent color spaces. An ICC profile is a set of data that characterizes a color input or output device, or a color space, according to standards promulgated by the International Color Consortium (ICC); every device that captures or displays color can have its own profile and many manufacturers provide ICC profiles for their products.

Figure 2:
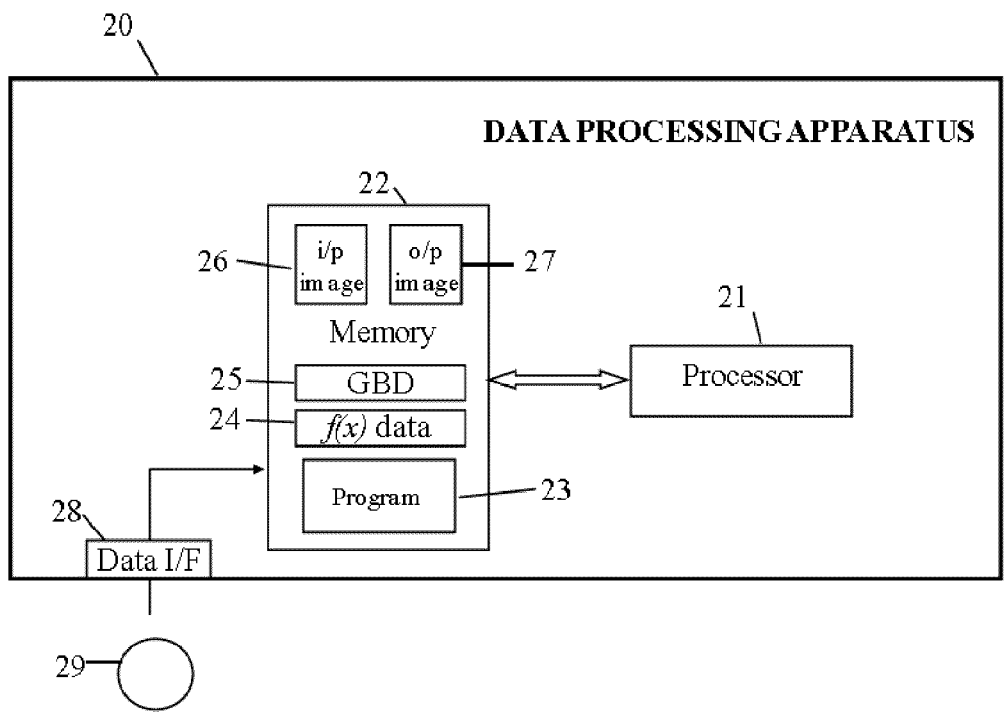
FIG. 2 is a functional block diagram of data processing apparatus for implementing an embodiment of the present invention.

FIG. 2 depicts data processing apparatus 20 for carrying out an the image processing method embodying the invention. The data processing apparatus 20 can be stand-alone apparatus or integrated into a device such as an image output device (monitor or printer). The apparatus 20 comprises:

a processor 21 arranged to execute an image processing program 23 to apply a modification function f(x) which, in the present embodiment, is arranged to modify a lightness component of an image;

a memory 22 (here taken to include both non-volatile and volatile components, as appropriate) for storing the program 23, data 24 defining the modification function f(x), gamut boundary description (GBD) data 25, unprocessed (input) image data 26, intermediate processing results, and processed (output) image data 27; and a data interface 28.

The program 23 is loaded into the apparatus through the data interface 28, for example, from a storage medium such as an optical disc 29 via an appropriate read/write device of the apparatus (not separately shown). The data interface 28 is also used for the input of the unprocessed image data 26 and output of the processed image data 27. Both the memory 22 and the optical disc 29 are examples of apparatus-readable media.

Figure 3:
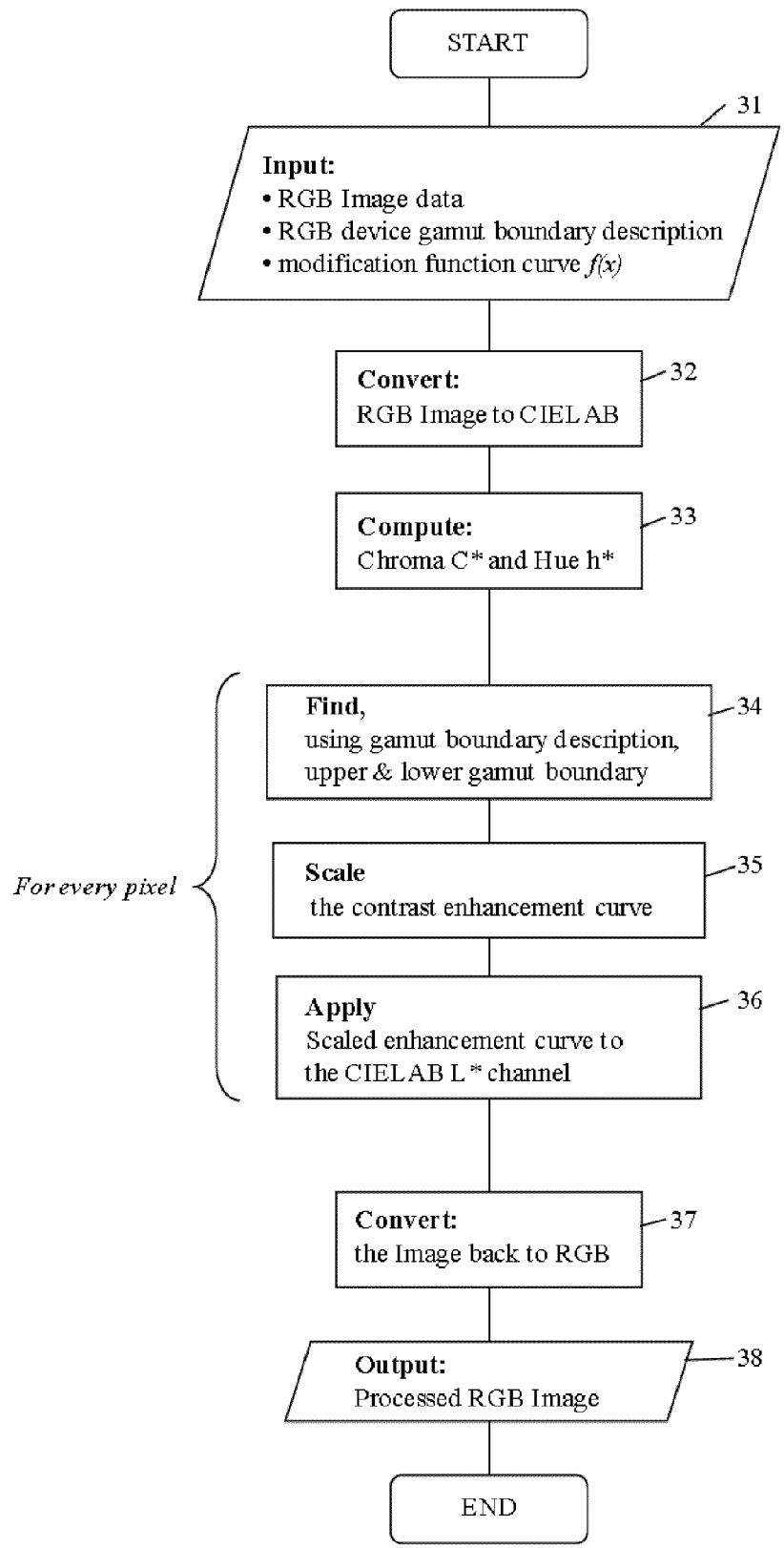
FIG. 3 is a flow chart illustrating an image processing method embodying the present invention.

FIG. 3 is a flow chart illustrating the main steps 31 to 38 of the image processing method implemented by the apparatus 20 when operating under the control of program 23 executing on processor 21. As already noted, in the present embodiment the modification function f(x) to be applied to the image is arranged to act on a lightness component of the image (that is, x is the input lightness value of the pixel concerned); by way of example, the modification function f(x) can be arranged to perform local and global contrast enhancement, that is, gamma correction, shadow lightening and highlight darkening, as well as dynamic range stretching, and even sharpness. The method steps 31 to 38 are as follows.

In step 31, the apparatus receives and stores various data inputs, namely:

The color image data 26 to be processed, encoded as pixel color values in a device dependent color space (e.g. RGB), the Gamut Boundary Description (GBD) 25 for the device dependent color space extracted from the device ICC profile or any other mapping between the device-dependent and device-independent color spaces, and the data 24 defining the modification function f(x) (for example, contrast manipulation curve(s) which is(are) to be applied on the image lightness axis L*) described in the device independent color space.

It will be appreciated that these inputs need not all be received together and receiving all inputs in step 31 is depicted merely for clarity. Furthermore, the modification function data 24 and device gamut boundary descriptor 25 could be embedded in the program 23 if this data is invariant for the image processing to be effected by the program 23.

In step 32, the image color values in the input image data 26 are converted to values of a device independent color space, in this case CIELAB, which has a lightness dimension orthogonal to its other dimensions.

In step 33, the image values are further converted into the CIELCH color space (though this is not essential) giving pixel values of lightness L*, chroma C* and hue h.

Steps 34 to 36 are then carried out for each pixel in the image.

In step 34, using the GBD, the upper and lower lightness-range limit values $GB_h$ and $GB_l$ are determined for the chroma C* and hue h* values of the pixel under consideration (c.f. FIG. 1).

In step 35, the limit values $GB_h$ and $GB_l$ are used to particularize a scaling function ψ that is applied to the modification function f(x) to ensure that the lightness values resulting from application of the modification function remain within the range set by the limit values $GB_h$ and $GB_l$. In the general case, the resultant transformation g(x) to be applied to a pixel has the form:

$$g(x)=\psi(GB_l, GB_h, f(x)) \quad (1)$$

The modification function f(x) is defined over the maximum dynamic range of the encoding used, for example over the range 0-255 for 8-bit encoding. An example scaling function is described hereinafter.

In step 36, the scaled modification function, that is, the transformation g(x) is applied to the pixel under consideration.

In step 37, the modified image data is converted back to the device-dependent RGB color space of the input image to provide the processed image data 27.

In step 38, the processed image data 27 is output.

The above described image processing method allows performing image enhancement operations in a device-independent color space domain without color degradation.

An example scaling function ψ will now be described; in fact, for this example, the scaling function is integrated with the terms of the modification function f(x) to give the transformation g(x) as follows:

$$g(x) = Dr_Y \left[ \left( \frac{x - Sh_X}{Dr_X} \right)^{p_1} \right]^{\alpha p_2} + GB_l \quad (2)$$

where x is the input lightness value of the pixel concerned. The parameters $Dr_X$ and $Dr_Y$ (detailed below) control the stretching/squeezing of the lightness dynamic range with $Dr_X$ having a dependency on the limit values $GB_h$ and $GB_l$; the term $GB_l$ in equation (2) provides a suitable offset.

The values $Dr_X$ and $Dr_Y$ are determined as follows:

$$Dr_X = Hl_X - Sh_X \quad (3)$$

$$Dr_Y = GB_h - GB_l \quad (4)$$

where $Hl_X$, $Sh_X$ are highlight and shadows values of the original image.

With regard to the other parameters in Equation (2), $p_1$ controls the strength of gamma correction, $p_2$ controls the strength of contrast enhancement (S-curve), and α is a constant that can be used to strengthen or weaken the effect of contrast enhancement. The parameters $p_1$ and $p_2$ also have a dependency on the limit values $GB_h$ and $GB_l$ and are computed as follows:

$$p_1 = \frac{\log[(Mt_Y - GB_l)/Dr_Y]}{\log[(Mt_X - Sh_X)/Dr_X]} \quad (5)$$

$$p_2 = \left( \frac{Dr_Y}{Mt_Y - GB_l} \right) \left( \frac{m - Sh_X}{Dr_X} \right) - 1$$

where:
  m is some measure of the mean local lightness (L*) value in a neighborhood of x; and
  $Mt_Y$ is a re-scaled "Midtone" point.
The re-scaled "Midtone" point $Mt_Y$ is computed as:

$$Mt_Y = \frac{Mt_{Y_0} * Dr_Y}{Dr_X + GB_l} \quad (6)$$

where $Mt_{Y0}$ is the required output mid-tone value at the neutral axis (i.e. C*=0).

Note that $Hl_X$, $Sh_X$ and $Mt_X$ are measured on a given image (for example, by an image analysis module called upon by program 23) whereas $GB_l$ and $GB_h$ are defined by the gamut boundary at a particular pixel. The additional target parameters, $Mt_{Y_0}$ and α, are defined according to the reproduction and enhancement preferences, and are set by an image analysis module or by the user.

It will be appreciated that many variants are possible to the above described embodiments of the invention. Thus, as already noted, although the described embodiment relates to the scaling of a modification function used to modify the lightness component of the image color, the invention is equally applicable to the scaling of a modification function used to modify a different color component of the image after the image pixel values have been converted into a device independent color space having that component as one of its orthogonal dimensions. As for the described embodiment, for a given pixel, upper and lower limits are determined on the permissible range of the color component to be modified, these limits being set by the device-dependent color space gamut boundary in the device-independent color space. The determined limits are then used to scale the modification function appropriately.

In fact, the modification function can be one that operates on more than one dimension of a device independent color space, the modification function being scaled according to the limits on the permissible ranges of the color components to be modified as set by the device-dependent color space gamut boundary in the device-independent color space.

Whereas in the foregoing, the upper and lower gamut boundary values have been determined on a per pixel basis and these values then used to scale the enhancement function for the pixel concerned (steps 34-36 in FIG. 3), it would alternatively be possible to take the image pixels in groups (for example, all pixels could be grouped by color—to do this in practice a mask is created representing all pixels having color values within a threshold of a color value associated with the mask value). For each group, mean chroma and hue values are determined and used to derive the upper and lower gamut boundary values for scaling the enhancement function for that group of pixels. It should, however, be noted that because the scaling of the enhancement function is based on group mean values, some individual pixels could move out of gamut when the enhancement function is applied, leading to a color change when translated back to the device-dependent color space. Nevertheless, the scaling of the enhancement function will have significantly reduced the amount of color changed as compared to not applying such scaling.

It will be apparent from the foregoing that the present invention is not limited to pixel value modification in the CIELAB/CIELCH device independent color spaces employed in the described embodiment, for example, the color spaces CIECAM97 and CIECAM02 could be used. The device independent color space chosen will depend on the design consideration of a particular system, and on color components to which the desired modification is to be applied.

Furthermore, it will be understand that although in the described embodiment, the image starts and finishes in an RGB device dependent color space, this is merely an example and the device dependent color space in which the image starts and finishes is unrestricted.

In the foregoing it has been assumed that the final device-dependent color space into which the image is converted after enhancement in the device-independent color space, is the same as the initial device-dependent color space in which the image is supplied. This is not necessarily the case and the final or 'target' device-dependent color space may differ from the color space in which the image is initially supplied (this initial color space need not be a device-dependent color space but could alternatively be a device independent color space). Since unwanted color changes arise out of gamut boundary restrictions in respect of the target device-dependent color space, it is the gamut boundary of the target device-dependent color space that must be used to determine the scaling of the enhancement function, regardless of whether this target color space is the same as or different from the color space in which the image is initially supplied.

The invention claimed is:
1. A method of minimizing unwanted changes of color during processing of an image of pixels having respective values, the method comprising:
  processing the image in a device-independent color space by applying a modification function in respect of one or more dimensions of the device-independent color space, the processing involving, for each image pixel or group of pixels:

determining, in respect of the one or more color-space dimensions subject of the modification function, modification limits in the device-independent color space as set by the gamut boundary of a target device-dependent color space, wherein the modification function has a dynamic range that depends on parameter values derived from the values of respective ones of the pixels of the image;

modifying the image pixel values in the device-independent color space according to said modification function as scaled by a factor dependent on a difference between upper and lower values of the gamut boundary modification limits; and converting the image into the target device-dependent color space.

2. The method according to claim 1, wherein said one or more dimensions of the device-independent color space subject of the modification function, is a first dimension of the device-independent color space, this first dimension being orthogonal to the other dimensions of the device-independent color space.

3. The method according to claim 2, wherein the modification limits are determined as the upper and lower values, along said first dimension, of the gamut boundary for the values, in the said other dimensions, of the pixel or group of pixels concerned.

4. The method according to claim 2, wherein the device-independent color space is one of CIELAB, CIELCH, CIECAM97 and CIECAM02.

5. The method according to claim 4, wherein said first dimension of the device-independent color space is lightness.

6. The method according to claim 5, wherein the modification function is arranged to effect contrast enhancement of the image.

7. The method according to claim 1, wherein said first dimension of the device-independent color space is lightness and the modification function is scaled to give a pixel-value transformation g(x) of the form:

$$g(x) = Dr_y \left[ \left( \frac{x - Sh_x}{Dr_x} \right)^{p_1} \right]^{\alpha p_2} + GB_l$$

where:
x is the input lightness value of the pixel, or group of pixels, concerned;
$Sh_X$ is a shadow value determined for the image;
$Dr_X$ and $Dr_Y$ are parameters for controlling the stretching/squeezing of the lightness dynamic range with $Dr_X$ having a dependency on the difference between the upper and lower limits values $GB_h$ and $GB_l$;
$p_1$ controls the strength of gamma correction;
$p_2$ controls the strength of contrast enhancement; and
$\alpha$ is a constant.

8. The method according to claim 7, wherein the values $Dr_x$ and $Dr_y$ are determined as follows:

$$Dr_X = Hl_X - Sh_X$$

$$Dr_y = GB_h - GB_l$$

where $Hl_X$ is a highlight value determined for the image.

9. The method according to claim 1, wherein the device-independent color space is CIELCH and said one or more dimensions of the device-independent color space subject of the modification function, is lightness; the modification limits being determined as the upper and lower lightness values of the gamut boundary for the chroma and hue values of the pixel, or group of pixels, concerned.

10. The method according to claim 1, wherein the image is supplied in an initial device-dependent color space and the method further comprises an initial operation of:
converting the image from pixel values encoded in the initial device-dependent color space into values of the device-independent color.

11. The method according to claim 10, wherein the initial device-dependent color space and the target device-dependent color space are the same.

12. A non-transitory apparatus-readable medium storing instructions for causing an information-processing apparatus to perform operations comprising:

processing an image of pixels having respective values in a device-independent color space by applying a modification function in respect of one or more dimensions of the device-independent color space, the processing involving, for each image pixel or group of pixels:

determining, in respect of the one or more color-space dimensions subject of the modification function, modification limits in the device-independent color space as set by the gamut boundary of a target device-dependent color space, wherein the modification function has a dynamic range that depends on highlight and shadow parameter values derived from the values of respective ones of the pixels of the image;

modifying the image pixel values in the device-independent color space according to said modification function as scaled by a factor dependent on a difference between upper and lower values of the gamut boundary modification limits; and converting the image into the target device-dependent color space.

13. The apparatus-readable medium according to claim 12, wherein said one or more dimensions of the device-independent color space subject of the modification function, is a first dimension of the device-independent color space, this first dimension being orthogonal to the other dimensions of the device-independent color space.

14. The apparatus-readable medium according to claim 13, wherein the modification limits are determined as the upper and lower values, along said first dimension, of the gamut boundary for the values, in the said other dimensions, of the pixel or group of pixels concerned.

15. The apparatus-readable medium according to claim 13, wherein the device-independent color space is one of CIELAB, CIELCH, CIECAM97 and CIECAM02.

16. The apparatus-readable medium according to claim 15, wherein said first dimension of the device-independent color space is lightness.

17. The apparatus-readable medium according to claim 16, wherein the modification function is arranged to effect contrast enhancement of the image.

18. The apparatus-readable medium according to claim 12, wherein said first dimension of the device-independent color space is lightness and the modification function is scaled to give a pixel-value transformation g(x) of the form:

$$g(x) = Dr_y \left[ \left( \frac{x - Sh_x}{Dr_x} \right)^{p_1} \right]^{\alpha p_2} + GB_l$$

where:
x is the input lightness value of the pixel, or group of pixels, concerned;
$Sh_X$ is a shadow value determined for the image;
$Dr_X$ and $Dr_Y$ are parameters for controlling the stretching/squeezing of the lightness dynamic range with $Dr_X$ having a dependency on the upper and lower limits values $GB_h$ and $GB_l$;
$p_1$ controls the strength of gamma correction;
$p_2$ controls the strength of contrast enhancement; and
α is a constant.

19. The apparatus-readable medium according to claim 18, wherein the values $Dr_X$ and $Dr_Y$ are determined as follows:

$$Dr_X = Hl_X - Sh_X$$

$$Dr_Y = GB_h - GB_l$$

where $Hl_X$ is a highlight value determined for the image.

20. The apparatus-readable medium according to claim 12, wherein the device-independent color space is CIELCH and said one or more dimensions of the device-independent color space subject of the modification function, is lightness; the modification limits being determined as the upper and lower lightness values of the gamut boundary for the chroma and hue values of the pixel, or group of pixels, concerned.

21. An apparatus, comprising:
a processor; and
instructions executable by the processor to cause the apparatus to perform operations comprising:
processing an image in a device-independent color space by applying a modification function in respect of one or more dimensions of the device-independent color space, the processing involving, for each image pixel or group of pixels:
determining, in respect of the one or more color-space dimensions subject of the modification function, modification limits in the device-independent color space as set by the gamut boundary of a target device-dependent color space, wherein the modification function has a dynamic range that depends on highlight and shadow parameter values derived from the values of respective ones of the pixels of the image;
modifying the image pixel values in the device-independent color space according to said modification function as scaled by a factor dependent on a difference between upper and lower values of the gamut boundary modification limits; and
converting the image into the target device-dependent color space.

22. The apparatus according to claim 21, wherein the device-independent color space is CIELCH and said one or more dimensions of the device-independent color space subject of the modification function, is lightness; the instructions being arranged to cause the modification limits to be determined as the upper and lower lightness values of the gamut boundary for the chroma and hue values of the pixel, or group of pixels, concerned.

* * * * *